(12) United States Patent
Taniguchi et al.

(10) Patent No.: US 8,736,132 B2
(45) Date of Patent: May 27, 2014

(54) STATOR OF ROTATING ELECTRICAL MACHINE

(75) Inventors: Makoto Taniguchi, Obu (JP); Keiji Kondou, Toyota (JP); Akito Akimoto, Kariya (JP)

(73) Assignee: Denso Corporation, Kariya (JP)

( * ) Notice: Subject to any disclaimer, the term of this patent is extended or adjusted under 35 U.S.C. 154(b) by 337 days.

(21) Appl. No.: 13/094,972

(22) Filed: Apr. 27, 2011

(65) Prior Publication Data

US 2011/0260570 A1 Oct. 27, 2011

(30) Foreign Application Priority Data

Apr. 27, 2010 (JP) .................. 2010-101921

(51) Int. Cl.
*H02K 3/04* (2006.01)
(52) U.S. Cl.
USPC .......................................................... 310/201
(58) Field of Classification Search
USPC .......................................................... 310/201
See application file for complete search history.

(56) References Cited

U.S. PATENT DOCUMENTS

| | | | |
|---|---|---|---|
| 5,097,167 A * | 3/1992 | Kanayama et al. ........... | 310/201 |
| 6,208,058 B1 * | 3/2001 | Taji et al. ...................... | 310/201 |
| 6,268,678 B1 | 7/2001 | Asao et al. | |
| 6,787,961 B2 * | 9/2004 | Neet et al. ...................... | 310/201 |
| 6,791,227 B2 * | 9/2004 | Yasuhara et al. .............. | 310/201 |
| 6,960,857 B2 * | 11/2005 | Oohashi et al. ............... | 310/179 |
| 7,268,456 B2 * | 9/2007 | Harada et al. ................. | 310/201 |
| 2005/0140239 A1 * | 6/2005 | Klamt et al. .................. | 310/201 |
| 2006/0145558 A1 * | 7/2006 | Kashihara et al. ............ | 310/180 |
| 2008/0224560 A1 | 9/2008 | Yoshida et al. | |
| 2009/0140594 A1 | 6/2009 | Ogawa et al. | |

FOREIGN PATENT DOCUMENTS

| | | |
|---|---|---|
| JP | 2001-211621 | 8/2001 |
| JP | 2008-228443 | 9/2008 |
| JP | 2009-153367 | 7/2009 |

OTHER PUBLICATIONS

Office Action issued in corresponding Japanese Patent Application No. 2010-101921 dated Oct. 8, 2013 (with translation).

* cited by examiner

*Primary Examiner* — Tran Nguyen
(74) *Attorney, Agent, or Firm* — Nixon & Vanderhye, P.C.

(57) ABSTRACT

A turn part of a lead wire includes a projection part, a slope part and a second bent part. The projection part projects from a first slot to a direction parallel to an axial direction of the stator core. The slope part is diagonally extended at an angle of less than 90 degrees aiming to a Kth slot. The Kth slot is separated from the first slot at a specific interval via a first bent part that is bent in a circumferential direction from a tip of the projection part. The second bent part is connected with the slot accommodation part accommodated in the Kth slot, and is bent to the direction parallel to the axial direction of the stator core from a tip of the slope part.

17 Claims, 4 Drawing Sheets

STATOR OF ROTATING ELECTRICAL MACHINE

CROSS-REFERENCE TO RELATED APPLICATION

This application is based on and claims the benefit of priority from earlier Japanese Patent Application No. 2010-101921 filed Apr. 27, 2010, the description of which is incorporated herein by reference.

TECHNICAL FIELD

The present disclosure relates to a stator of a rotating electrical machine equipped in a vehicle, for example.

BACKGROUND

Recently, technologies that improve the winding density of a stator winding are variously proposed by so-called distributing winding the stator winding in a stator core in order to miniaturize, make highly effective and reduce noise in an electric motor installed in a vehicle etc.

For example, density growth is achieved by continuously forming a flat lead wire as disclosed in JP 2001-211621.

However, in the forming like the above-mentioned JP 2001-211621, since the winding of the lead wire at a coil end of the stator winding (a part that projects from an end portion in an axial direction in the stator core) is needed to be bent a plurality of times, damage to an insulation film that covers a surface of the lead wire increases.

Moreover, when a fat lead wire is adopted to reinforce an output density grows, the damage to the insulation film becomes further more because a load necessary to bend the lead wire becomes large, too.

Therefore, it becomes necessary to thicken a thickness of the Insulation film, or paint the film in many layers by using different materials, and thus results in a high cost.

SUMMARY

An embodiment provides a stator of a rotating electrical machine that reduces damage to an insulation film of a lead wire that composes a stator winding while suppressing enlargement of a coil end of a stator winding.

In a stator of a rotating electrical machine according to a first aspect, the stator of the rotating electrical machine includes a stator core with an annular shape having a plurality of slots in a circumferential direction, and a stator winding formed by winding a plurality of lead wire around the stator core.

The lead wire has a slot accommodation part accommodated in the slot and a turn part that mutually connects the slot accommodation parts that are accommodated in the different slot in a circumferential direction outside of the slot, and bent parts are formed to two positions of the turn part and the turn part is formed in non-symmetric shape in the circumferential direction.

Accordingly, when the lead wires are wound around the stator core with the wiring machine etc., for example, since the bent parts are formed in only two places in the turn parts of the lead wires that compose the stator winding, the load that is imposed on an insulation film of the lead wire can be reduced.

In addition, since the shape of the turn part is formed to the non-symmetric shape in the direction of the outer circumference, it becomes easy to over-lap the adjoining turn parts at the coil end, thus spacing efficiency improves.

Therefore, damage to the insulation film of the lead wires can be reduced while suppressing enlargement of the coil end.

In the stator of the rotating electrical machine according to a second aspect, the turn part includes a projection part that projects from a first slot to a direction parallel to an axial direction of the stator core, and a slope part bent in a circumferential direction from a tip of the projection part and diagonally extended at an angle of less than 90 degrees aiming to a Kth slot (K is a natural number) that is separated from the first slot at a specific interval.

In the stator of the rotating electrical machine according to a third aspect, a second slope part a of a second lead wire extended from a second slot that is adjacent to the first slope part side of the first slot over-laps an anti-stator core side of the first slope part of a first lead wire extended from the first slot.

In the stator of the rotating electrical machine according to a fourth aspect, the stator winding has m phases (m is a natural number), has a number of slot n (n is a natural number) per phase and per pole, and has 2p magnetic poles.

A total number of the slot in the stator core is m×n×2p (p is a natural number) and the k is m×n+1, and the lead wire is a continuous line that winds once around the stator core by repeating the projection part and the slope part 2p times at the interval of the first slot and Kth slot.

In the stator of the rotating electrical machine according to a fifth aspect, when the lead wire winds around the stator core by 3 turns (3 is a natural number), at least two slot accommodation parts of the 2p slot accommodation parts in the same turn have the same radial distance from an axial center of the stator core.

In the stator of the rotating electrical machine according to a sixth aspect, at least one of the slope part of another lead wire that does not overlap on the slope part of its own lead wire is visible in a group of the slope parts that composes the inner most or outer most layer when a coil end of the stator winding is viewed from the axial direction.

In the stator of the rotating electrical machine according to a seventh aspect, the turn part is provided with a first crank section that is bent outside in a radial direction of the stator core formed in at least one of either the first bent part formed between the projection part and the slope part, or the slope part.

In the stator of the rotating electrical machine according to an eighth aspect, at least one portion of the slope part of the turn part is provided with a second crank section that is bent inside in a radial direction of the stator core.

In the stator of the rotating electrical machine according to a ninth aspect, an interval in a circumferential direction between the first crank section and the second crank section is set to differ in m×n turn parts in the one magnetic pole pitch.

In the stator of the rotating electrical machine according to a tenth aspect, the number of the turn parts where the slope part over-laps is m×n.

In the stator of the rotating electrical machine according to an eleventh aspect, a coil end of the stator winding has a protruding section that is a part of an outer most turn part protrudes outside in a radial direction.

In the stator of the rotating electrical machine according to a twelfth aspect, a coil end of the stator winding has a protruding section that is a part of an inner most turn part protrudes inside in a radial direction.

In the stator of the rotating electrical machine according to a thirteenth aspect, the number of the lead wires that compose the stator winding is 2×m×n, and at least m×n lead wires begin winding from adjoining m×n slots of the stator core.

In the stator of the rotating electrical machine according to a fourteenth aspect, the number of the lead wires that compose the stator winding is 2×m×n, and 2×m×n lead wires begin winding from adjoining 2×m×n slots of the stator core.

In the stator of the rotating electrical machine according to a fifteenth aspect, at least the slot accommodation part of the lead wire is a flat wire.

DETAILED DESCRIPTION OF THE PREFERRED EMBODIMENTS

With reference to the drawings, hereinafter will be described an embodiment of the present disclosure.

Figure 1:
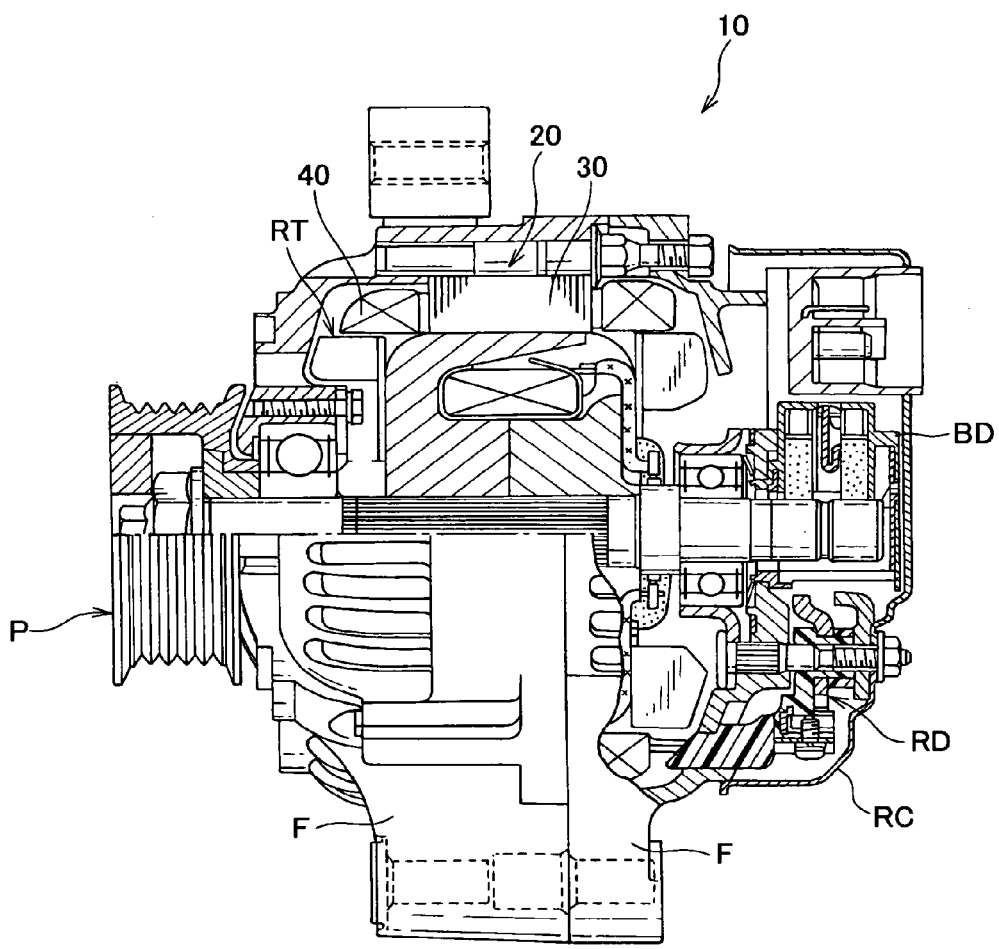
FIG. 1 shows a sectional view of an AC generator in which a stator of a rotating electrical machine in an embodiment is applied.

A stator in the present embodiment is used for an electric motor of a vehicle and a rotating electrical machine that functions as a generator, for example. FIG. 1 is a sectional view showing a composition of the AC generator for vehicles as the rotating electrical machine.

The AC generator 10 is constituted including a stator 20, the rotor RT, a frame F, a brush device BD, a rectifying device RD, a rear cover RC, a pulley P, and the like.

The stator 20 is provided with the stator core 30 and the stator winding 40 of three phases formed with a plurality of (12 in the present embodiment) lead wires.

The rotor RT is rotatably accommodated in an inner perimeter side of stator 20.

A plurality of magnetic poles (4 magnetic poles in the present embodiment) that have alternately different polarities in a direction of an outer circumference formed by a permanent magnet is disposed on an outer perimeter of the rotor.

The outer perimeter of the rotor RT faces an inner perimeter of the stator 20 via a very small air-gap.

The stator core 30 is formed like an annular by accumulating magnetic steel sheets with a specific thickness in an axial direction, and a plurality of slots are formed in an inner perimeter thereof.

The plurality of slots is formed so that a direction of depth agrees with a radial direction.

The number of slots formed to the stator core 30 is set to a ratio of two for a phase of the stator winding 40 in respect to a number of magnetic poles (2p=4) of the rotor RT.

In the present embodiment, the total number of the slot is assumed to be 24 from 4×3×2=24.

A number of slot n per one phase of one pole is 2.

Next, the stator winding 40 wound around the stator core 30 is explained referring to FIG. 2 and FIG. 3.

Figure 2A:
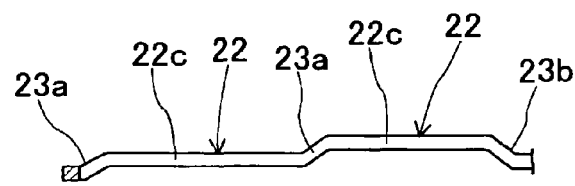
FIGS. 2(A), 2(B) and 2(C) show a part of a lead wire that composes a stator winding in the embodiment, and (A) is a plan view seen from A side of (B), (B) is a front elevation view, and (C) is a bottom view seen from B side of (B)
Figure 2B:
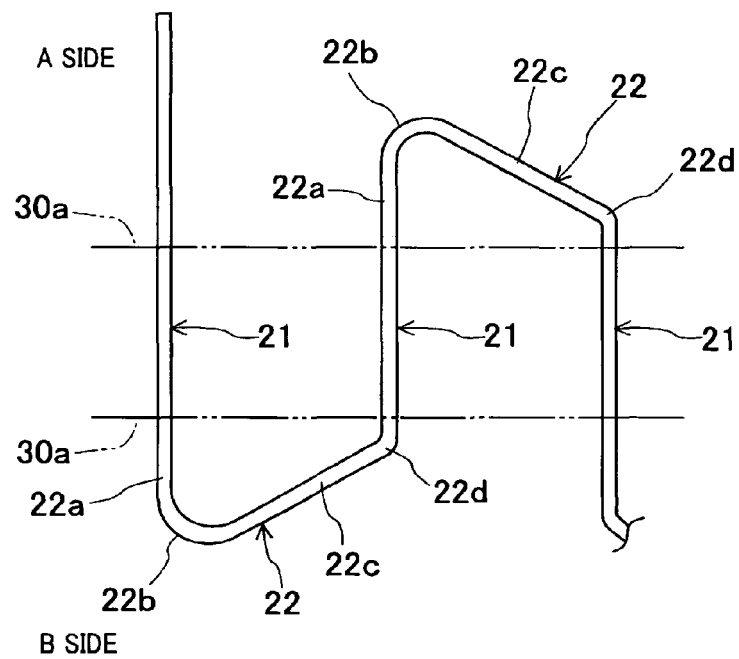
Figure 2C:
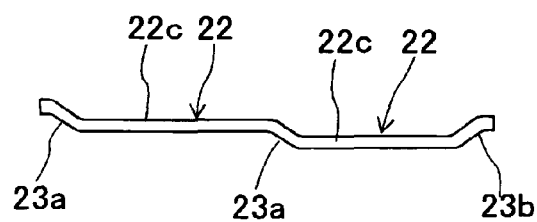

FIGS. 2A-2C are diagrams showing a part of the lead wire (lead wire 1 of FIG. 3) that composes the stator winding 40.

Figure 3A:
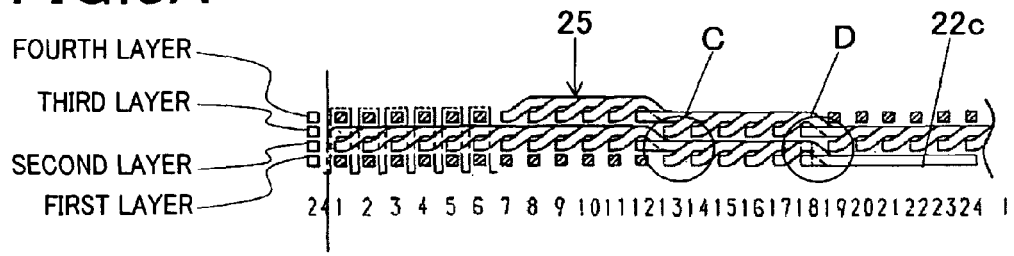
FIGS. 3(A), 3(B) and 3(C) show development views that develop in a direction of surroundings of the stator winding in the embodiment, and (A) is a development view seen from A side of (B), (B) is a development view seen from inner perimeter side, and (C) is a development view seen from B side of (B)
Figure 3B:
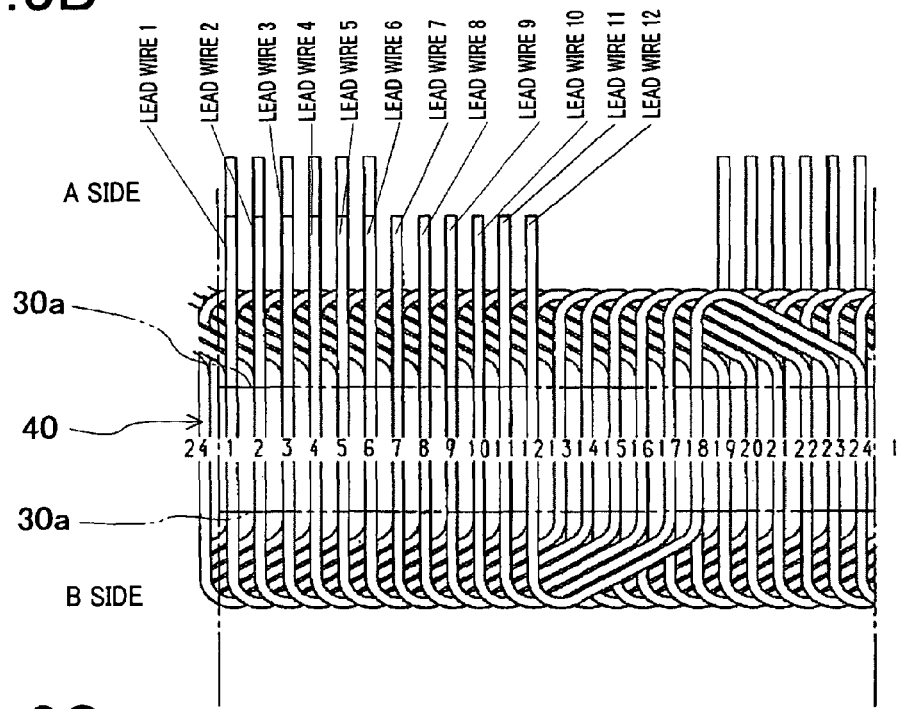
Figure 3C:
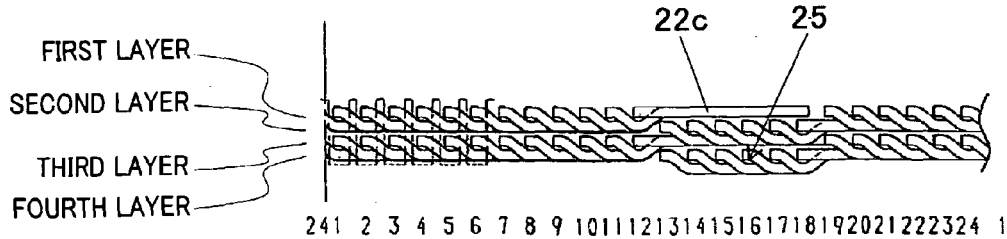

FIGS. 3A-3C are development views that develops in a direction of an outer circumference of the stator winding 40 in the present embodiment.

In FIGS. 3A-3C, numbers 1-24 given respectively are the numbers of the slots where the lead wire that composes stator winding 40 is accommodated.

The stator winding 40 is composed by 12 lead wires 1-12 that are made of an insulation-coated flat wire.

Each of the lead wires 1-12 has, as shown in FIG. 2, a slot accommodation part 21 accommodated in the slot and a turn part 22 that mutually connects the slot accommodation parts 21 that are accommodated in the different slot in a circumferential direction outside of the slot.

The turn part 22 has a part that projects from end portion 30a in an axial direction of the stator core 30, and a coil end of the stator winding 40 is formed with a set of the turn parts 22.

The turn part 22 includes a projection part 22a, a slope part 22c and a second bent part 22d. The projection part 22a projects straight from a first slot (one of the slots) to a direction parallel to an axial direction of the stator core 30.

The slope part 22c is diagonally extended at an angle of less than 90 degrees aiming to a Kth slot (another one of the slots). The Kth slot is separated from the first slot at a specific interval (one magnetic pole pitch) via a first bent part 22b that is bent in a circumferential direction from a tip of the projection part 22a.

The second bent part 22d is connected with the slot accommodation part 21 accommodated in the Kth slot, and is bent to the direction parallel to the axial direction of the stator core 30 from a tip of the slope part 22c.

That is, the first bent part 22b and the second bent part 22d are formed to two positions of the turn part 22, and the turn part 22 is formed in non-symmetric shape in the circumferential direction.

Further, a first crank section 23a that is bent outside in a radial direction of the stator core 30 is formed in one place of either the first bent part 22b of the turn part 22 or the slope part 22c.

Moreover, a second crank section 23b that is bent inside in the radial direction of the stator core 30, which is opposite to the first crank section 23a, is formed near a second bent part 22d side end portion of the slope part 22c.

An amount of a gap to a radial direction of the first crank section 23a and the second crank section 23b is almost equivalent to a width of one lead wire.

The first crank section 23a and the second crank section 23b are provided to enable the turn part 22 to over-lap with other turn parts 22 while evading interference between adjoining turn parts 22 by off-setting an one end portion in the circumferential direction of the turn part 22 and another end portion in an amount of a width of one read wire.

An interval in the circumferential direction between the first crank section 23a and the second crank section 23b is set to differ in six (m×n) turn parts 22 in the one magnetic pole pitch.

In the stator winding 40, m is 3 phase, the number of slots n of one pole per one phase is 2, the rotor RT is provided with the 2p magnetic poles, a total number of the slot in the stator core 30 is m×n×2p, and the above-mentioned k is m×n+1.

By this, the lead wire is a continuous line that winds around once around the stator core 30 by repeating the projection part and the slope part 2p times at the interval of the first slot and Kth slot.

In this case, ends of the windings become 24 since the number of continuous lines is 12.

Since the interval of the adjacent slot of the stator core 30 is 30 degrees in an electric angle in the stator winding 40, the lead wire 1 accommodated in slot numbers {1,7,13,19} is a first U phase (U1), and the lead wire 2 accommodated in slot numbers {2,8,14,20} is a second U phase (U2).

Figure 4:
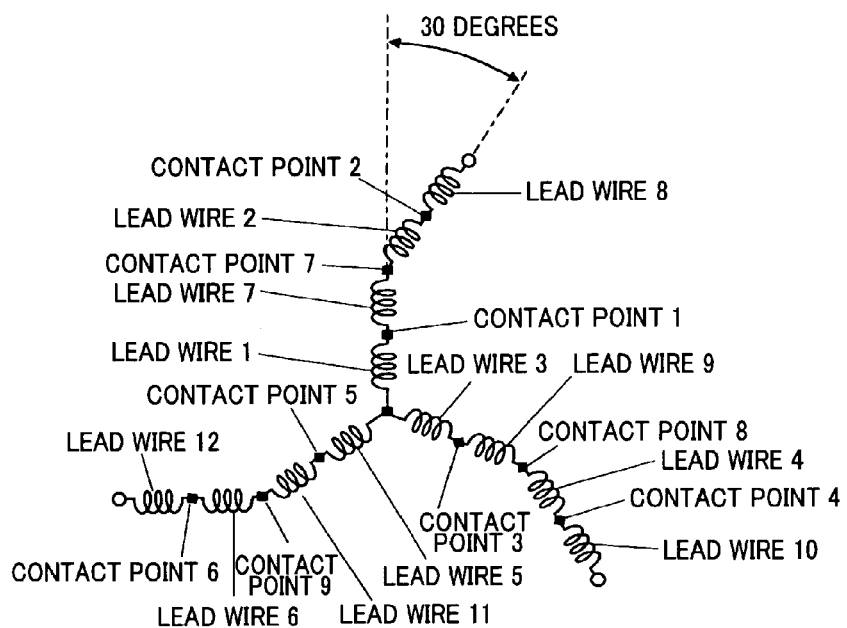
FIG. 4 is an explanatory chart that shows an example of connecting the stator winding in the embodiment.
Figure 5:
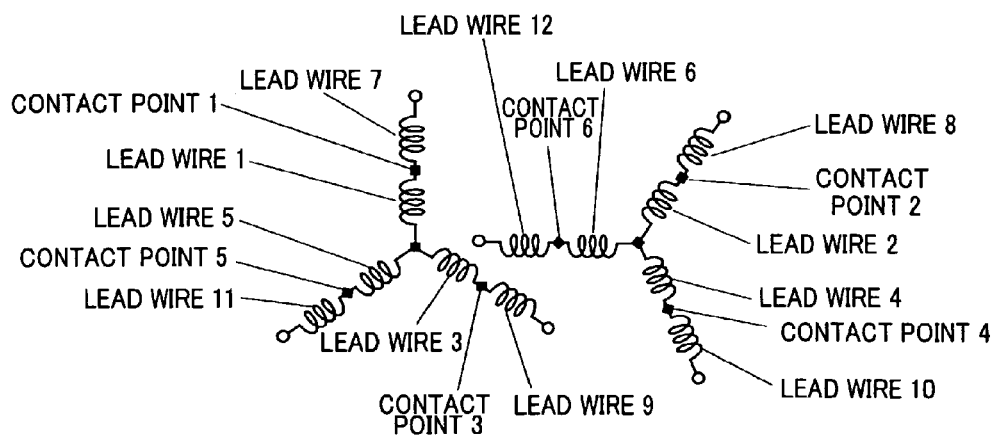
FIG. 5 is an explanatory chart that shows other examples of connecting wires of the stator winding in the embodiment.

Ends of the first U phase (U1) and the second U phase (U2) can be treated according to a usage like a case of a zigzag connecting wiring that is connected in series mutually and driven by a pair of inverters as shown in FIG. 4, or like a case of an electromagnetic noise cancellation connecting wiring that is driven independently by two inverters electrically as shown in FIG. 5.

Similarly, the lead wire 3 accommodated in the slot numbers {3,9,15,21} is a first W phase (W1), the lead wire 4 accommodated in the slot numbers {4,10,16,22} is a second W phase (W2), the lead wire 5 accommodated in the slot numbers {5,11,17,23} is a first V phase (V1), and the lead wire 6 accommodated in the slot numbers {6,12,18,24} is a second V phase (V2).

Relations between (V1) and (V2), and (W1) and (W2) are the same as that of (U1) and (U2), and constitute the zigzag connecting wiring of three phases Y or a pair of independent three phases of Y connection of the cancellation wiring.

Next, the process of winding the lead wire around the stator core 30 with a nozzle-type wiring machine is explained.

The present embodiment begins winding from the adjoining six (m×n) slots of the stator core 30 by six (m×n) lead wires out of twelve (2×m×n) lead wires that compose the stator winding 40.

First of all, regarding the slot numbers 7-12 is explained.

It is assumed that these six lead wires are called lead wires 7, 8, 9, 10, 11, and 12 respectively, and are accommodated in the slot simultaneously.

The six lead wires 7-12 are inserted from a A side coil end to a B side of the stator core 30 simultaneously, and are bent at the B side coil end in the right of FIG. 3, then form the slope parts 22c with a specific angle toward six slots ahead, that is, the slot numbers {13,14,15,16,17,18}.

The six lead wires 7-12 are inserted in a first layer in each slot at this time.

FIG. 3A shows a development view seen from the A side coil end of FIG. 3B, and hatched lead wires show end portions of the first layer (innermost layer), the second layer, the third layer, and the fourth layer (outermost layer) from the bottom.

FIG. 3C shows a development view seen from the B side coil end of FIG. 3B, and shows the first layer (innermost layer), the second layer, the third layer, and the fourth layer (outermost layer) from the bottom.

As shown in FIG. 3C, the slope part 22c of the lead wire 7 that comes out from the seventh slot at this time returns from the second layer to the first layer via the second crank section 23b provided near the end portion of the second bent part 22d side of the slope part 22c after moves from the first layer to the second layer via the first crank section 23a.

According to the rule that the slope part 22c of the lead wire B that comes out of the eighth slot over-laps under the B side of the slope part 22c of the lead wire 7 and the slope part 22c of the lead wire 9 that comes out of the ninth slot over-laps under the B side of the slope part 22c of the lead wire 8 that comes out of the eighth slot, the slope part 22c of the lead wire 12 that comes out of the twelfth slot over-laps sequentially.

An entire part of the slope part 22c of lead wire 12 that comes out from the twelfth slot is exposed to the B side.

The lead wires 7-12 that form each slope part 22c are bent toward the slot of slot number {13,14,15,16,17,18} six slots ahead, and inserted from the B side coil end to the A side in the first layer in the slot simultaneously.

Further, the lead wires 7-12 are bent to the right of FIG. 3, as mentioned above, to six slots ahead, that is, to the slot of the slot number {19,20,21,22,23,24} to form the slope part 22c with a specific angle in the A side coil end.

The slope part 22c of the lead wire 7 that comes out from the thirteenth slot at this time returns from the second layer to the first layer via the second crank section 23b provided near the end portion of the second bent part 22d side of the slope part 22c after moves from the first layer to the second layer via the first crank section 23a.

According to the rule that the slope part 22c of the lead wire 8 that comes out of the fourteenth slot over-laps over the A side of the slope part 22c of the lead wire 7 and the slope part 22c of the lead wire 9 that comes out of the fifteenth slot over-laps over the A side of the slope part 22c of the lead wire 8 that comes out of the fourteenth slot, the slope part 22c of the lead wire 12 that comes out of the eighteenth slot over-laps sequentially.

An entire part of the slope part 22c of lead wire that comes out from the eighteenth slot is exposed to the A side.

Here, the bending of the lead wires 7-12 when over-lapping the slope part 22c is explained in detail.

For example, when the lead wire 7 that comes out from the 13th slots is bent to the right of FIG. 3, the lead wire 7 forms the slope part 22c evading the lead wires 8-12 that come out from the slot of slot number {14,15,16,17,18} after once bent to the outer perimeter side (C part of FIG. 3A).

In FIG. 3A, the slope part 22a winds around the second layer. Similarly, the lead wire 8 that comes out from the fourteenth slots evades the lead wires 9-12 that come out from the slot of the slot numbers {15,16,17,18} and the forms slope part 22c.

The lead wire 9 that comes out from the fifteenth slot evades the lead wires 10-12 that come out from the slots of the slot numbers {16,17,18}. In another words, the number of lead wires that six lead wires 7-12 should evade are different.

Moreover, the lead wires 7 that comes out from the thirteenth slot is bent to the inner perimeter side immediately before being inserted to the nineteenth slot, then inserted to the first layer of the nineteenth slot (D part of FIG. 3A).

Similarly, the lead wires 8-12 are bent to the inner perimeter side between the eighteenth slot and the nineteenth slot, and form the slope part 22c that over-laps.

However, since the lead wire 12 that comes out from the eighteenth slot has no lead wire (the turn part) that interferes in the bending direction, it is bent to the right of FIG. 3 as it is not bent to the outer perimeter side.

Similarly, the lead wires 7-12 are inserted to the first layer of the slot of the slot numbers {19,20,21,22,23,24} from the A side coil end to the B side coil end next, and are bent to the right of FIG. 3 on the B side coil end as mentioned above.

Here, the lead wires 7-12 ends a first turn and enters a second turn, and the lead wires 7-12 are inserted to the second layer of the slots of the slot numbers {1,2,3,4,5,6} from the B side coil end to the A side coil. Then a third and fourth turns are performed consecutively so that the ends of the windings appear to the fourth layer (outer most) of the slots of the slot numbers {1,2,3,4,5,6}.

Next, regarding the slot numbers 1-6 is explained.

It is assumed that these six lead wires are called lead wires 1, 2, 3, 4, 5, and 6 respectively, and the six lead wires are accommodated simultaneously to the slot.

The six lead wires 1-6 are inserted from the A side coil end to the B side simultaneously, and are bent to the right of FIG. 3 at the B side coil end. Then the six lead wires 1-6 form the slope part 22c with a specific angle toward the slot of six slots ahead, that is, the slot numbers {7,8,9,10,11,12}.

The six lead wires 1-6 in each slot {1,2,3,4,5,6} are inserted in the first layer at this time.

Although the six lead wires 1-6 are inserted from the B side coil end to the A side in the slot of the slot numbers {7,8,9,10,11,12}, each is inserted in the second layer because the lead wires 7-12 have been already inserted to the first layer.

After that, the six lead wires 1-6 are inserted in each slot of the second layer according to the same rule as the above-mentioned lead wires 7-12, and the ends of the windings appear in the fourth layer of the slot of the slot numbers {19,20,21,22,23,24} when the fourth turn is ended.

When viewing the coil end composed as above from the A side (refer to FIG. 3A), it is shown that a protruding section 25 that protrude by an amount of one lead wire from the outer most parts that extend over the slot numbers 8-12 is formed.

Moreover, it is featured that a part (slope part 22c) where the lead wire 12 is exposed without intersecting with other lead wires over the slot numbers 18-24 is formed.

Further, when viewing the coil end from the B side (refer to FIG. 3A), it is featured that a protruding section 25 that protrude by an amount of one lead wire from the outer most parts that extend over the slot numbers 13-18 is formed.

Furthermore, it is featured that a part 22c where the lead wire 12 is exposed without intersecting with ether lead wires over the slot numbers 12-18 is formed.

Next, an example of processing the ends of the specific number of the lead wires 1-12 that are accommodated in all slots like mentioned above is explained.

The ends of the lead wires 1-12 in the first layer are named end 1-1, end 2-1 . . . end 12-1, and the ends of the lead wires 1-12 in the fourth layer are named end 1-4, end 2-4 . . . end 12-4. The end 1-4 and the end 7-4 are connected (contact point 1) by welding, for example, the end 2-4 and the end 8-4 are connected (contact point 2), the end 3-4 and the end 9-4 are connected (contact point 3), the end 4-4 and the end 10-4 are connected (contact point 4), the end 5-4 and the end 11-4 are connected (contact point 5), and the end 6-4 and the end 12-4 are connected (contact point 6).

In addition, the end 7-1 and the end 2-1 ire connected (contact point 7), the end 9-1 and the end 4-1 are connected (contact point 8), and the end 11-1 and the end 6-1 are connected (contact point 9).

Then, when connecting the contact points 1-1, 3-1, and 5-1 as a neutral point, it becomes a zigzag connecting winding wire shown in FIG. 4.

As mentioned above, according to the stator 20 of the rotating electrical machine in the present embodiment, when the lead wires 1-12 are wound around the stator core 30 with the wiring machine etc., since the bent parts 22b and 22d are formed with only two places in the turn parts 22 of the lead wires 1-12 that compose the stator winding 40, the load imposed on an insulation film of the lead wire 1-12 can be reduced.

In addition, since the shape of the turn part 22 is formed to the non-symmetric shape in the direction of the outer circumference, it becomes easy to over-tap the adjoining turn parts 22 at the coil end, thus spacing efficiency improves.

Therefore, damage to the insulation film of the lead wires 1-12 can be reduced while suppressing enlargement of the coil end.

Especially, since the turn parts 22 of the lead wires 1-12 are formed by the projection parts 22a, the first bent parts 22b, the slope parts 22c, and the second bent parts 22d, a bending rate of the first bent part 22b can be set comparatively large, and can reduce the damage to the insulation film of the lead wires 1-12 effectively.

Moreover, since the spacing efficiency of the turn part 22 at the coil end can be improved, the enlargement of the coil end can be profitably suppressed.

Further, since the second slope part 22c of the second lead wire extended from the second slot that is adjacent to the first slope part 22c side of the first slot over-laps an anti-stator core side of the first slope part 22c of the first lead wire extended from the first slot in the present embodiment, each slope part 22c can be efficiently accommodated, thus the enlargement of the coil end can be effectively suppressed.

Especially, since the number of the turn parts 22 where the slope part 22c over-laps is six (m×n), the stator winding 40 can be easily manufactured.

Moreover, since the lead wire that composes the stator winding 40 is the continuous line that winds once around the stator core 30 by repeating the projection part 22a and the slope part 22c 2p times at the interval of the first slot and Kth slot in the present embodiment, the coil end can be easily composed while evading being enlarged even if it is a multiphase winding or a winding with a specification of an advantageous spread factor for decreasing the sound vibration.

Moreover, since in the lead wire that winds around the stator core 30 four turns in the present embodiment, at least two slot accommodation parts 21 of the 2p slot accommodation parts 21 in the same turn have the same radial distance from the axial center of the stator core 30, a rate of area that the lead wire occupies inside the slot of the stator core 30 and a rate of area that the lead wire occupies at the coil end can be maximized.

Further, since the stator winding 30 in the present embodiment is composed so that at least one of the slope part 22c of the other lead wires that does not over-lap on the slope part 22c of its own lead wire is visible in a group of the slope parts that composes the inner most or outer most layer when the coil end is viewed from the axial direction, each turn part 22 can be compactly accommodated into the specific spaces at the coil end.

Therefore, the enlargement of the coil end can be profitably avoided.

Furthermore, the first crank section 23a is provided at least on one of the first bent part 22b of the turn part 22 and the slope part 22c in the present embodiment, it becomes possible to over-lap on the other turn parts 22 at the coil end while evading the interference between adjoining turn parts 22.

Moreover, since the second crank section 23b that is bent inside in the radial direction of the stator core 30, which is opposite to the first crank section 23a, is formed with at least one portion of the slope part 22c of the turn part 22, an over-lap structure to the other turn parts can be achieved more profitably.

Since the interval in the circumferential direction between the first crank section 23a and the second crank section 23b is set to differ in m×n turn parts 22 in the one magnetic pole pitch, each turn part 22 can be compactly accommodated further more easily into the specific spaces at the coil end.

Further, since the coil end of the stator winding 40 has the protruding section 25 that is a part of the outer most turn part 22 protrudes outside in the radial direction, and the protruding section 25 that is a part of the inner most turn part 22 protrudes inside in the radial direction, the stator winding 40 can be easily manufactured.

Moreover, since the six (m×n) lead wires begin winding from the adjoining six (m×n) slots of the stator core 30 when the twelve lead wires are wound around the stator core 30 in the present embodiment, the wiring machine that winds the lead wire around the stator core 30 can be composed compactly.

Furthermore, since the lead wire made of the insulation coating flat wire is adopted in the present embodiment, the rate of area that the lead wire occupies inside the slot of the stator core 30 can be improved.

OTHER EMBODIMENTS

The present disclosure is not limited in the above-mentioned embodiment, but can be variously modified within the range in which it does not deviate from the outline of the present disclosure.

For example, the present disclosure is applied to a distributing winding of two poles with three phase and 24 slots in the above-mentioned embodiment, the number of poles, the distribution factor, and the number of phase can be arbitrarily set.

Moreover, although the example of connecting the 12 lead wires 1-12 in the zigzag connecting wiring as show in FIG. 4 is shown in the above-mentioned embodiment, an electromagnetic noise cancellation winding as shown in FIG. 5, in another words, a method of winding a pair of the electricity insulated three phase connecting wires being mutually coupled magnetically (wound around the common stator core) with 30 degrees electrical phase difference becomes possible to achieve by changing the connection of the wire ends.

Further, although the above-mentioned embodiment begins winding from the adjoining six (m×n) slots of the stator core 30 by the six (m×n) lead wires out of the twelve (2×m×n) lead wires that compose the stator winding 4, the twelve lead wires (2×m×n) may be begun wiring from the adjoining twelve (2×m×n) slots of the stator core 30.

The wiring machine that winds the lead wire can be composed further more compactly from the above.

What is claimed is:

1. A stator of a rotating electrical machine comprising:
a stator core with an annular shape having a plurality of slots in a circumferential direction; and
a stator winding formed by winding a plurality of lead wire around the stator core;
wherein, the lead wire has a slot accommodation part accommodated in the slot and a turn part that mutually connects the slot accommodation parts that are accommodated in the different slot in a circumferential direction outside of the slot; and
bent parts are formed to two positions of the turn part and the turn part is formed in non-symmetric shape in the circumferential direction; wherein:
the turn part comprises:
a projection part that projects from a first slot in a direction parallel to an axial direction of the stator core;
a slope part bent in a circumferential direction from a tip of the projection part and diagonally extended at an angle of less than 90 degrees aiming to a Kth slot (K is a natural number) that is separated from the first slot at a specific interval;
the stator winding has m phases (m is a natural number), has a number of slots n (n is a natural number) per phase and per pole, and has 2p magnetic poles;
a total number of the slots in the stator core is m×n×2p (p is a natural number) and the k is m×n+1;
the lead wire is a continuous line that winds around once around the stator core by repeating the projection part and the slope part 2p times at the interval of the first slot and Kth slot; and
when the lead wire winds around the stator core by J turns (J is a natural number), at least two slot accommodation parts of the 2p slot accommodation parts in the same turn have the same radial distance from an axial center of the stator core.

2. The stator of the rotating electrical machine according to claim 1, wherein, a second slope part of a second lead wire over-laps an anti-stator core side of the first slope part of a first lead wire extended from the first slot, wherein the second slope part is extended from a second slot that is adjacent to the first slope part side of the first slot.

3. The stator of the rotating electrical machine according to claim 1, wehrein at least one of the slope part of another lead wire that does not overlap on the slope part of the own lead wire is visible in a group of the slope parts that composes the inner most or outer most layer when a coil end of the stator winding is viewed from the axial direction.

4. The stator of the rotating electrical machine according to claim 1, wherein, the turn part is provided with a first crank section that is bent outside in a radial direction of the stator core formed in at least one of either the first bent part formed between the projection part and the slope part, or the slope part.

5. The stator of the rotating electrical machine according to claim 4, wherein, at least one portion of the slope part of the turn part is provided with a second crank section that is bent inside in a radial direction of the stator core.

6. The stator of the rotating electrical machine according to claim 5, wherein, an interval in a circumferential direction between the first crank section and the second crank section is set to differ in m×n turn parts in the one magnetic pole pitch.

7. The stator of the rotating electrical machine according to claim 1, wherein, the number of the turn parts where the slope part over-laps is m×n.

8. The stator of the rotating electrical machine according to claim 4, wherein, a coil end of the stator winding has a protruding section that is a part of an outer most turn part protrudes outside in a radial direction.

9. The stator of the rotating electrical machine according to claim 4, wherein, a coil end of the stator winding has a protruding section that is a part of an inner most turn part protrudes inside in a radial direction.

10. The stator of the rotating electrical machine according to claim 1, wherein, the number of the lead wires that compose the stator winding is 2×m×n, and at least m×n lead wires begin winding from adjoining m×n slots of the stator core.

11. The stator of the rotating electrical machine according to claim 1, wherein, the number of the lead wires that compose the stator winding is 2×m×n, and 2×m×n lead wires begin winding from adjoining 2×m×n slots of the stator core.

12. The stator of the rotating electrical machine according to claim 1, wherein, at least the slot accommodation part of the lead wire is a flat wire.

13. A stator of a rotating electrical machine comprising:
a stator core with an annular shape having a plurality of slots in a circumferential direction; and
a stator winding formed by winding a plurality of lead wire around the stator core;
wherein, the lead wire has a slot accommodation part accommodated in the slot and a turn part that mutually connects the slot accommodation parts that are accommodated in the different slot in a circumferential direction outside of the slot; and bent parts are formed to two positions of the turn part and the turn part is formed in non-symmetric shape in the circumferential direction;

wherein, the turn part comprises:

a projection part that projects from a first slot in a direction parallel to an axial direction of the stator core, and a slope part bent in a circumferential direction from a tip of the projection part and diagonally extended at an angle of less than 90 degrees aiming to a Kth slot (K is a natural number) that is separated from the first slot at a specific interval; and wherein the turn part is provided with a first crank section that is bent outside in a radial direction of the stator core formed in at least one of either the first bent part formed between the projection part and the slope part, or the slope part.

14. The stator of the rotating electrical machine according to claim 13, wherein, at least one portion of the slope part of the turn part is provided with a second crank section that is bent inside in a radial direction of the stator core.

15. The stator of the rotating electrical machine according to claim 14, wherein, an interval in a circumferential direction between the first crank section and the second crank section is set to differ in m×n turn parts in the one magnetic pole pitch.

16. The stator of the rotating electrical machine according to claim 13, wherein, a coil end of the stator winding has a protruding section that is a part of an outer most turn part protrudes outside in a radial direction.

17. The stator of the rotating electrical machine according to claim 13, wherein, a coil end of the stator winding has a protruding section that is a part of an inner most turn part protrudes inside in a radial direction.

* * * * *